US007764979B2

(12) United States Patent
Nah

(10) Patent No.: US 7,764,979 B2
(45) Date of Patent: Jul. 27, 2010

(54) MOBILE TERMINAL FOR PERFORMING CALL TO CALLEE BY SEQUENTIAL CALLING OF PRIORITIZED CALLEE NUMBERS AND MULTIMEDIA ADDRESSES

(75) Inventor: Mahn-Gil Nah, Gyeonggi-Do (KR)

(73) Assignee: LG Electronic Inc., Seoul (KR)

( * ) Notice: Subject to any disclaimer, the term of this patent is extended or adjusted under 35 U.S.C. 154(b) by 391 days.

(21) Appl. No.: 11/338,683

(22) Filed: Jan. 25, 2006

(65) Prior Publication Data

US 2006/0166662 A1 Jul. 27, 2006

(30) Foreign Application Priority Data

Jan. 26, 2005 (KR) .................. 10-2005-0006985

(51) Int. Cl.
*H04W 4/00* (2009.01)
(52) U.S. Cl. .................... 455/564; 455/466; 455/566
(58) Field of Classification Search ................ 455/564, 455/551, 566, 466
See application file for complete search history.

(56) References Cited

U.S. PATENT DOCUMENTS

| 5,842,139 | A | * | 11/1998 | Muramatsu et al. ......... 455/563 |
| 6,788,953 | B1 | * | 9/2004 | Cheah et al. ............. 455/550.1 |
| 6,792,082 | B1 | * | 9/2004 | Levine ..................... 379/67.1 |
| 2002/0086710 | A1 | | 7/2002 | Humes |
| 2003/0126288 | A1 | * | 7/2003 | Tsurusaki et al. ........... 709/239 |
| 2003/0202642 | A1 | | 10/2003 | Wheeler et al. |
| 2003/0210778 | A1 | | 11/2003 | Bates et al. |
| 2004/0204119 | A1 | | 10/2004 | Ho et al. |

FOREIGN PATENT DOCUMENTS

| EP | 1 324 574 A1 | 7/2003 |
| FR | 2 818 072 A1 | 6/2002 |
| GB | 2 347 590 A | 9/2000 |
| JP | 2002-078002 A | 3/2002 |
| JP | 2002-368864 A | 12/2002 |
| JP | 2003-298721 A | 10/2003 |

\* cited by examiner

*Primary Examiner*—Nick Corsaro
*Assistant Examiner*—Vladimir Magloire
(74) *Attorney, Agent, or Firm*—Birch, Stewart, Kolasch & Birch, LLP

(57) ABSTRACT

A method for performing a call is disclosed. When a user attempts a call at a certain phone number of another party but ends in a call unavailable state, the user can automatically make a call at another contact of the another party's contacts stored in the phone book of the another party by using call state information provided from a mobile communication network system. The method comprises making a first call at first contact of another party desired for a call connection, receiving call state information with respect to a call unavailable state of the first call if the first call ends in the call unavailable state, analyzing the received call state information and searching a phone book of the another party, and making a second call at second contact read from the phone book of the another party based on the analysis and search.

7 Claims, 9 Drawing Sheets

SMS composing window

MOBILE TERMINAL FOR PERFORMING CALL TO CALLEE BY SEQUENTIAL CALLING OF PRIORITIZED CALLEE NUMBERS AND MULTIMEDIA ADDRESSES This application claims, under 35 U.S.C. §119, the priority benefit of the Korean Patent Application No. 10-2005-0006985 filed on Jan. 26, 2005 in Republic of Korea, the entire contents of which are hereby fully incorporated by reference.

BACKGROUND OF THE INVENTION

1. Field of the Invention

The present invention relates to a mobile terminal, and particularly, to a mobile terminal for performing a call and a method therefore.

2. Description of the Related Art

In general, a mobile terminal includes an internal memory in which a phone book for storing phone numbers and e-mail addresses as well as various control programs is stored. In particular, the phone book is one of service menus provided by the mobile terminal, which may be configured to have various types of contact information per person such as phone numbers, addresses, e-mail addresses, etc.

The phone book is discriminated by a phone book page called a hot key given to each name. Accordingly, when a user (namely, a caller) wants to make a call to a particular person (namely, a callee or another party) among names included in the phone book, commonly, the user would attempt a call by pressing the hot key number corresponding to a phone book page of the particular person, rather than directly pressing a phone number of the particular person. When the user presses the hot key corresponding to the phone book of the particular person, a call is performed to be connected with a representative phone number stored in the phone book of the particular person.

In addition, the call can be performed by inputting the name of the particular person, rather than using the corresponding hot key of the particular person.

However, when the user attempts the call to the particular person, the call may not be connected due to various reasons, putting the user into a call unavailable state. The call unavailable state may include a state that another party is currently on the phone, a state that a mobile terminal of the other party is in an OFF state, or a state that the other party does not answer the call of the user (the no-response state).

When the call attempted by the user to the other party is in the call unavailable state, a certain device (e.g., a HLR (Home Location Register)) of a mobile communication network system to which the user and the other party have been subscribed recognizes the cause of the call unavailableness and a MSC (Mobile Switching Center) of the mobile communication network system provides call state information with respect to the unavailable call to the mobile terminal of the user. Herein, the call state information is a certain digital code called a 'cause code'.

However, even though the mobile terminal of the user receives the call state information, namely, the cause code, connection of the user's call to the other party is failed. Then, the user must search some other contact information, than the phone number of the other party to which the call has been attempted for connection, from the phone book by personally manipulating keys, select searched another contact of the phone book, and attempt a call again. Thus, a technical solution in this matter is required.

BRIEF DESCRIPTION OF THE INVENTION

Therefore, an object of the present invention is to provide a method for performing a call, in which when a user attempts a call to a certain phone number of another party but ends in a call unavailable state, the user can automatically make a call at some other contacts at the another party by using call state information provided from a mobile communication network system.

To achieve at least the above objects in whole or in parts, there is provided a method for performing a call of a mobile communication terminal comprising: performing a call at one of contacts of another party desired for a call connection; automatically performing a follow-up call at another contact of the another party' contacts if the call connection is failed.

Preferably, the method further comprises receiving call state information from a mobile communication network system if the call connection is failed.

Preferably, the method further comprises providing a message composing window if the contact at which to perform the follow-up call is a kind of a message contact; and performing a follow-up call by transmitting a message composed by a user on the message composing window.

To achieve at least the above objects in whole or in parts, there is further provided a method for performing a call of a mobile communication terminal comprising: (a) making a first call at first contact of another party desired for a call connection; (b) receiving call state information with respect to a call unavailable state of the first call if the first call ends in the call unavailable state; (c) analyzing the received call state information and searching a phone book of the another party; and (d) making a second call at second contact read from the phone book of the another party based on the analysis and search.

Preferably, the step (c) comprises: displaying the analyzed call state information; and checking whether some other contacts than the first contact have been inputted in the phone book of the another party.

Preferably, the step (d) comprises: checking whether call priority has been set in the phone book of the another party; if call priority has been set, reading second contact set with second call priority; if call priority has not been set, displaying the phone book of the another party and selecting and reading by a user the second contact at which a call is to be made to the another party from the phone book of the another party; and making a second call at the read second contact.

Preferably, in the step (d), when the second call performed to the second contact ends in a call unavailable state, call state information of the terminal of the another party with respect to the second call is received from the mobile communication network system, the steps (c) and (d) are performed again to read third contact, at which a third call is to be attempted to the another party, from the phone book of the another party and performs a third call to the third contact.

Preferably, the step of making a second call at the read second contact comprises: providing a message composing window if the second contact is a message receiving address; and composing by the user a message in the message composing window and performing the second call at the second contact.

To achieve at least these advantages in whole or in parts, there is further provided a mobile communication terminal for performing a call comprising: a memory unit for storing a phone book including at least one or more contacts with respect to a particular party; a controller for analyzing call state information transmitted by a mobile communication network system, searching contacts from a phone book of another party stored in the memory unit to perform a successive call to another party, reading the corresponding contact, and performing the successive call; and a RF unit for transmitting a call to the another party and receiving call state information transmitted by a mobile communication network system.

Preferably, the terminal further comprises a display for displaying the analyzed call state information and the phone book stored in the memory unit and providing a message composing window under the control of the controller.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF THE INVENTION

The present invention is implemented in a mobile communication terminal. And in addition, the present invention can be applied for a wireless communication and multimedia communication terminal operating according to a different specification. Namely, the mobile communication terminal includes a mobile communication terminal-combined multimedia communication terminal such as at least a PDA phone, a PTT phone, a DMB phone, a DVB phone, and media FLO phone.

The present invention pays an attention to the fact that a general mobile communication network system (e.g., the HLR) provides to a caller information regarding a communication state of a mobile terminal of another party (i.e., a callee) (e.g., a busy state (the another party is on the phone), a power-OFF state, a no-response state (the another party does not answer), a network instability, etc.).

A basic concept of the present invention is that when a user cannot perform call communication with another party over a phone number at which the user has called, a successive call can be automatically attempted at a different phone number among another party's contacts stored in the mobile terminal of the calling party based on cause code information.

The construction and operation of the present invention will now be described with reference to the accompanying drawings.

Figure 1:
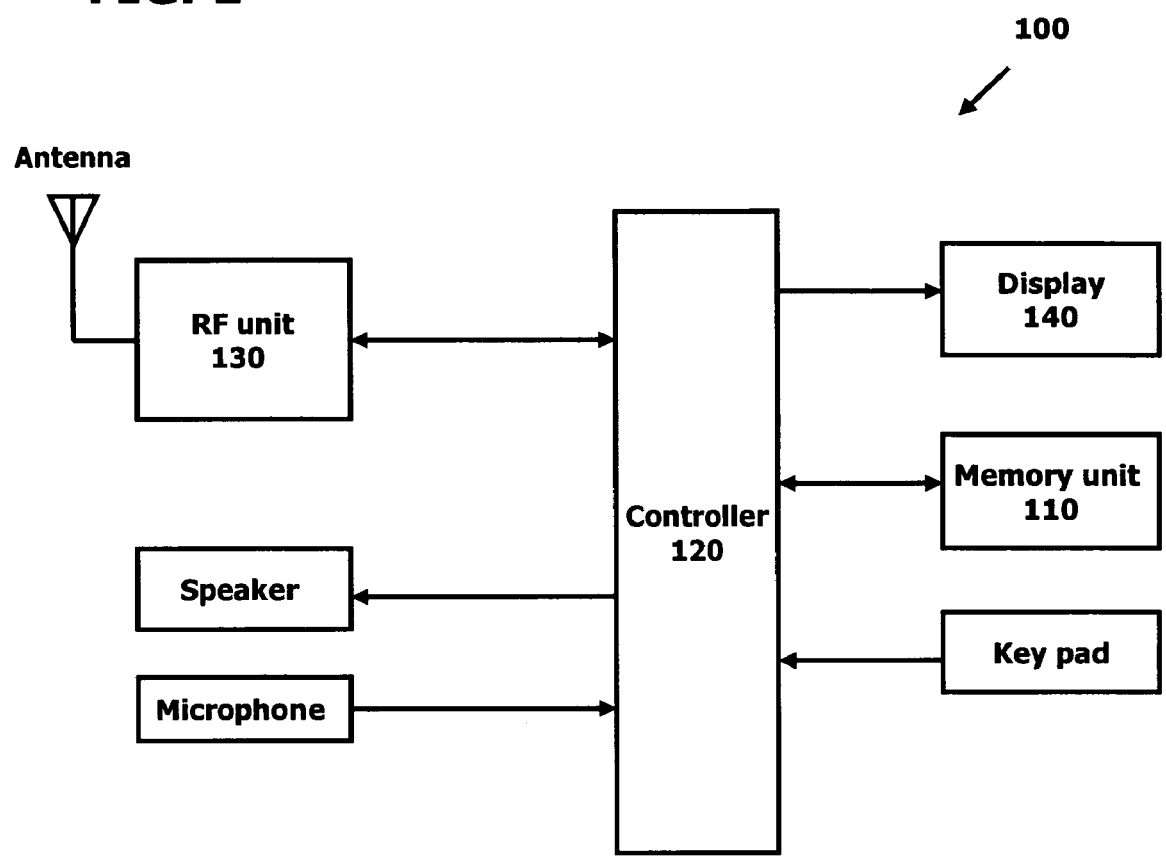
FIG. 1 is a schematic view showing the construction of a mobile terminal in accordance with the present invention.

FIG. 1 is a schematic view showing the construction of a mobile terminal in accordance with the present invention.

With reference to FIG. 1, a mobile terminal 100 includes a memory unit 110, a controller 120, a display 140 and a RF unit 140.

The memory unit 110 stores contact such as at least one or more phone numbers and e-mail addresses with respect to a particular party by setting a call priority level of each contact.

The controller 120 analyzes call state information transmitted from a mobile communication network system, searches contact of a phone book of another party stored in the memory unit 110 to perform a successive call to another party, reads corresponding contact based on a call priority level of the searched contact, and performs a successive call.

The RF unit 130 transmits a call (e.g. a contact such as . . . ) to the another party and receives a call state information transmitted by a mobile communication network system.

The display 140 displays the call state information which has been analyzed by the controller 120 and the phone book stored in the memory unit 110, and provides a message composing window (e.g. one of an e-mail composing window, SMS composing window and MMS composing window) under the control of the controller 120.

Besides, the mobile terminal also includes basic elements (not given reference numerals) of general mobile terminals as shown in FIG. 1. Namely, the mobile terminal basically includes a key pad allowing a user to input a phone number and compose a text message, a speaker for outputting a voice and a sound, a microphone for inputting a voice, an antenna for transmitting and receiving signals. The basic construction and its operation are obvious to those skilled in the art, so description therefor will be omitted for the sake of conciseness.

The function and operation of the present invention will now be described with reference to the accompanying drawings.

Figure 2A:
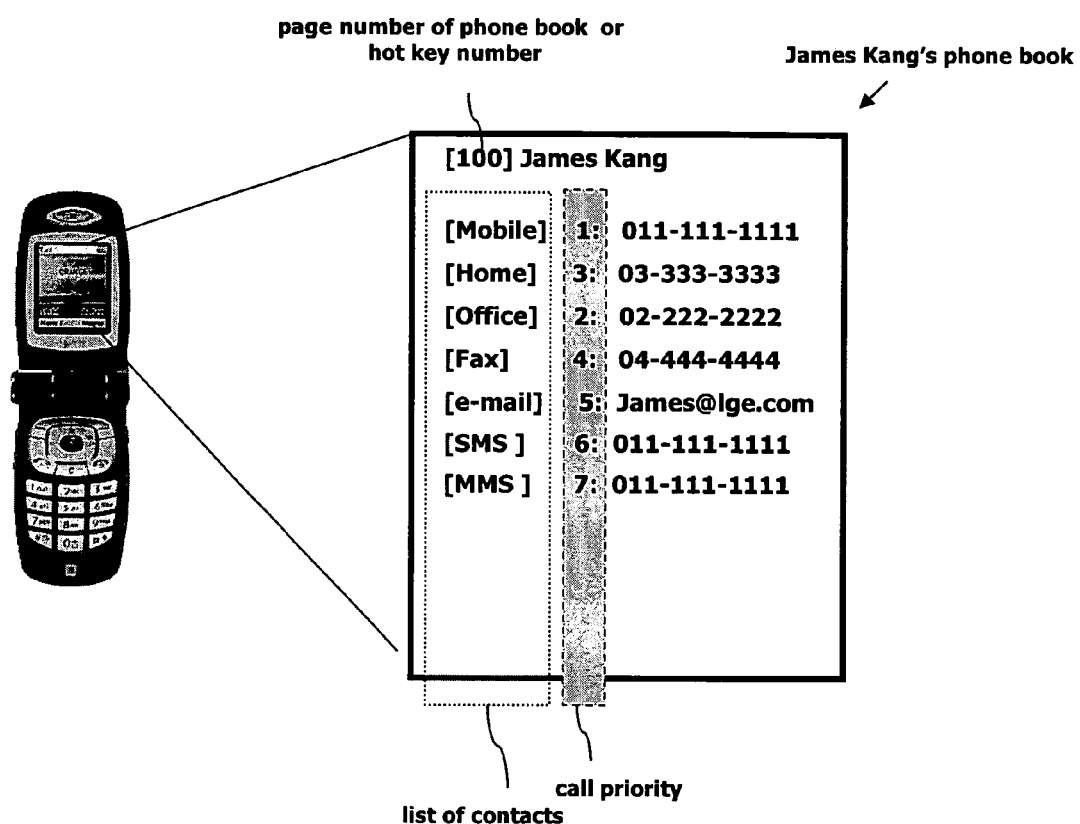
FIGS. 2A to 2C illustrate a phone book of each person stored in a memory unit of the mobile terminal in accordance with the present invention.
Figure 2B:
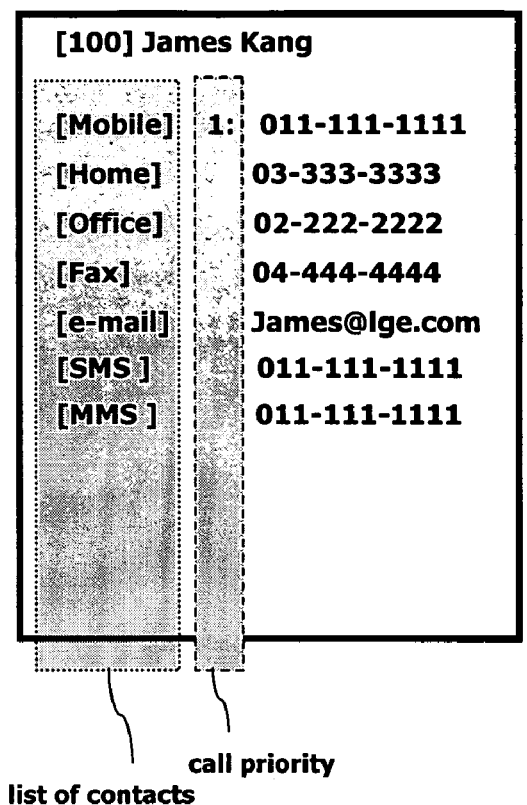
Figure 2C:
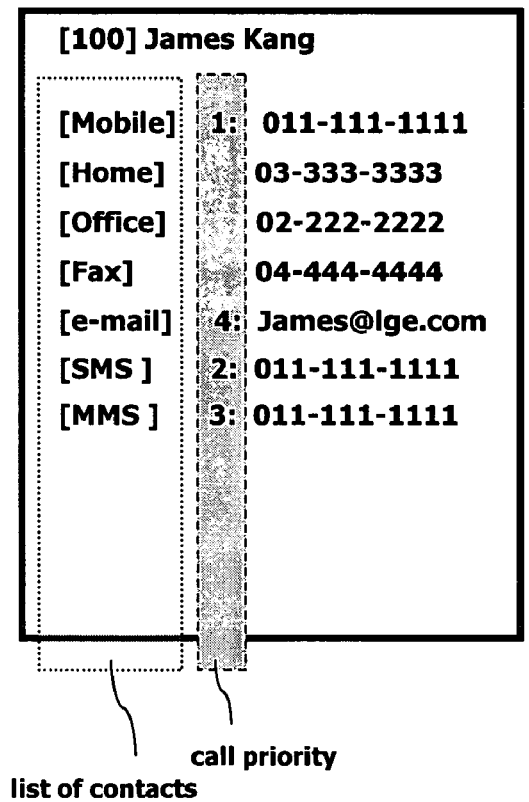

FIGS. 2A to 2C illustrate a phone book of each person stored in a memory unit of the mobile terminal in accordance with the present invention.

As shown in FIG. 2A, a user can input various types of contacts in a page (denoted by "100") of a phone book by names (e.g., "James Kang") by using a key pad of the mobile terminal 100 and stored them in the memory unit 110. Herein, the various types of contacts can include at least one or more phone numbers (e.g., a mobile phone number ([Mobile]), a home phone number ([Home]), an office phone number ([Office]), a facsimile number ([Fax]), etc.) and an e-mail address. In this case, the user can set a call priority for each contact of the phone book of a particular person (namely, 'James Kang') when storing contacts in the memory 110.

FIG. 2A shows an example of setting a call priority for each contact. That is, as shown, 'Mobile' can be set to have first call priority, 'Home' can be set to have second call priority, 'Office' can be set to have third call priority', 'Fax' can be set to have fourth call priority, and 'e-mail' can be set to have fifth call priority in a page (i.e., "100") of the phone book with respect to the particular person (namely, 'James Kang'). In addition, the various types of contacts, each having different call priority as set, of the particular person can be stored in the memory unit 110. In this respect, however, as shown in FIG. 2B, of the contacts of the particular person (i.e., "James Kang"), only 'Mobile' can be set as representative contact (namely, the first call priority) while other contacts may not be set for call priority.

In addition, call priority can be also set for an SMS or an MMS and inputted. For example, in FIG. 2A, 'SMS' is set with sixth call priority and 'MMS' is set with seventh call priority, while in FIG. 2C, 'SMS' is set with second call priority and 'MMS' is set with third call priority.

The operation of the present invention will be described based on the phone book by persons generated according to the present invention as shown in FIGS. 2A to 2C as follows.

Figure 3:
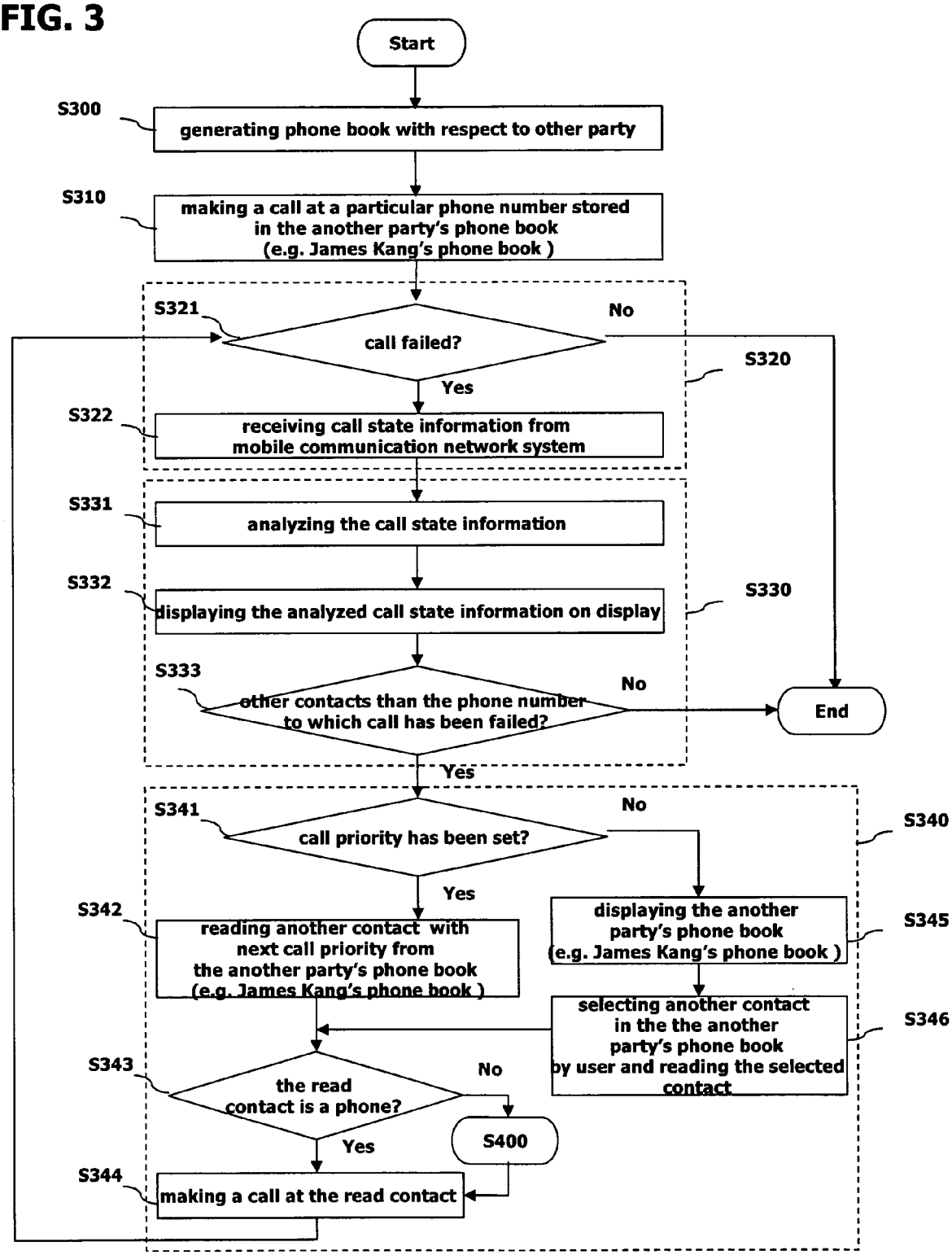
FIG. 3 is a flow chart illustrating a process of automatically performing a call when the mobile terminal is in a call unavailable state in accordance with the present invention.

FIG. 3 is a flow chart illustrating a process of automatically performing a call when the mobile terminal is in a call unavailable state in accordance with the present invention.

With reference to FIG. 3, the operation of the present invention can be divided into four parts. That is, first, call priority is set and a phone book with respect to another party is generated (step S300), second, the user makes a call at a phone number (e.g., a phone number with first priority, namely, a representative phone number) stored in the phone book of another party (step S310), third, when the call ends in a call unavailable state (namely, a call connection is failed), call state information is received and analyzed and another contacts is searched (step S330), and fourth, a call is performed at second call priority-set contact among the searched contacts (step S340).

The operation of the present invention will be described in detail with reference to FIGS. 1 to 3 as follows.

In inputting the phone book to the mobile terminal 100, as shown in FIGS. 2A to 2C, the user can set call priority for each contact of the particular person (James Kang) and store the call priority-set contact in the memory unit 110 (step S300).

In order to make a call to the particular person (James Kang), the user can make a first call at the particular phone number (e.g., 'Mobile' in FIG. 2A) stored in the memory unit 110 (step S310).

At this time, if a mobile terminal of the another party (namely, the particular person) is in call communication (the line is busy), if the mobile terminal of the another party is in an OFF state, or if the another party does not answer the call (namely, a no-response state), a connection of the first call is failed (step S321). Then, the mobile communication network system, to which the user and the another party have been subscribed, transmits call state information including a cause of the connection failure of the first call as a digital code (called 'cause code') to the user, and the mobile terminal 100 of the user receives it through the RF 130 (step S322). Herein, the call state information refers to information regarding the busy state, the power OFF state, the no-response state or the network instability, or the like.

Figure 4A:
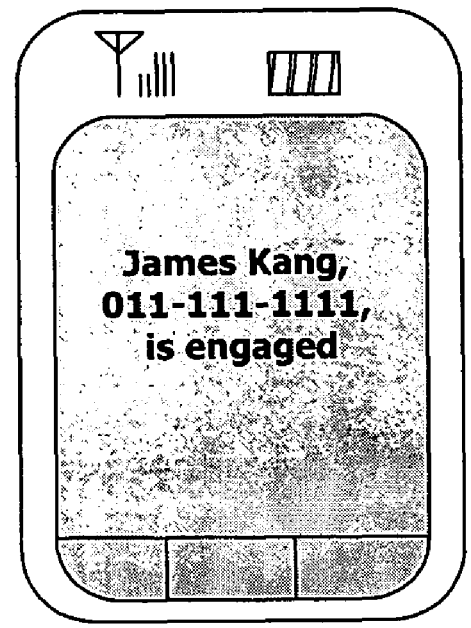
FIG. 4A shows an example of a message informing that a first call is has been attempted but a mobile terminal of another party is engaged in accordance with the present invention.

The controller 120 of the mobile terminal 100 analyzes the received digital code including the call state information (step S331), and displays the analyzed call state information (e.g., the line is busy) on the display 140 for user's information (step S332). In this case, the call state information can be provided to the user in various ways. For example, as shown in FIG. 4A, a notification message (namely, "James Kang, 011-111-1111, is engaged") can be displayed on the display 140. In addition, the call state information can be provided to the user in a form of a voice, a certain alarm sound or a certain icon (e.g., an image or video, etc.) together with the notification message.

The controller 120 analyzes the cause of the connection failure of the call (step S332) and searches the phone book stored in the memory unit 110 for another contact at which a successive call to another party can be attempted (step S333).

If some other contacts (i.e., a phone number or an e-mail address) exist in a page (as shown in FIG. 2A) of the phone book (e.g., James Kang's phone book) corresponding to another party (e.g., James Kang), the controller 120 checks whether call priority has been set for each of the searched contact existing in the page of the phone book (step S341).

If each contact has call priority (S341), the controller 120 reads contact corresponding to second call priority (i.e., Office 02-2202-2222) among the contact of the another party (James Kang) from the phone book stored in the memory unit 110 (step S342).

The controller 120 checks whether the read contact is not a phone number but different kinds of contacts, namely message contacts (e.g., one of an e-mail, SMS and MMS) (step S343).

Figure 4B:
FIG. 4B shows an example of a message informing that a second call is automatically performed in accordance with the present invention.

If a kind of the read contact for performing a call to the another party, is a (different) phone number (step S343), the controller 120 automatically performs a second call at the read contact (i.e., Office 02-222-2222) set with the second call priority (step S344). In this case, as shown in FIG. 4B, the controller can automatically display a message informing of the attempt of the second call to inform the user accordingly.

Figure 4C:
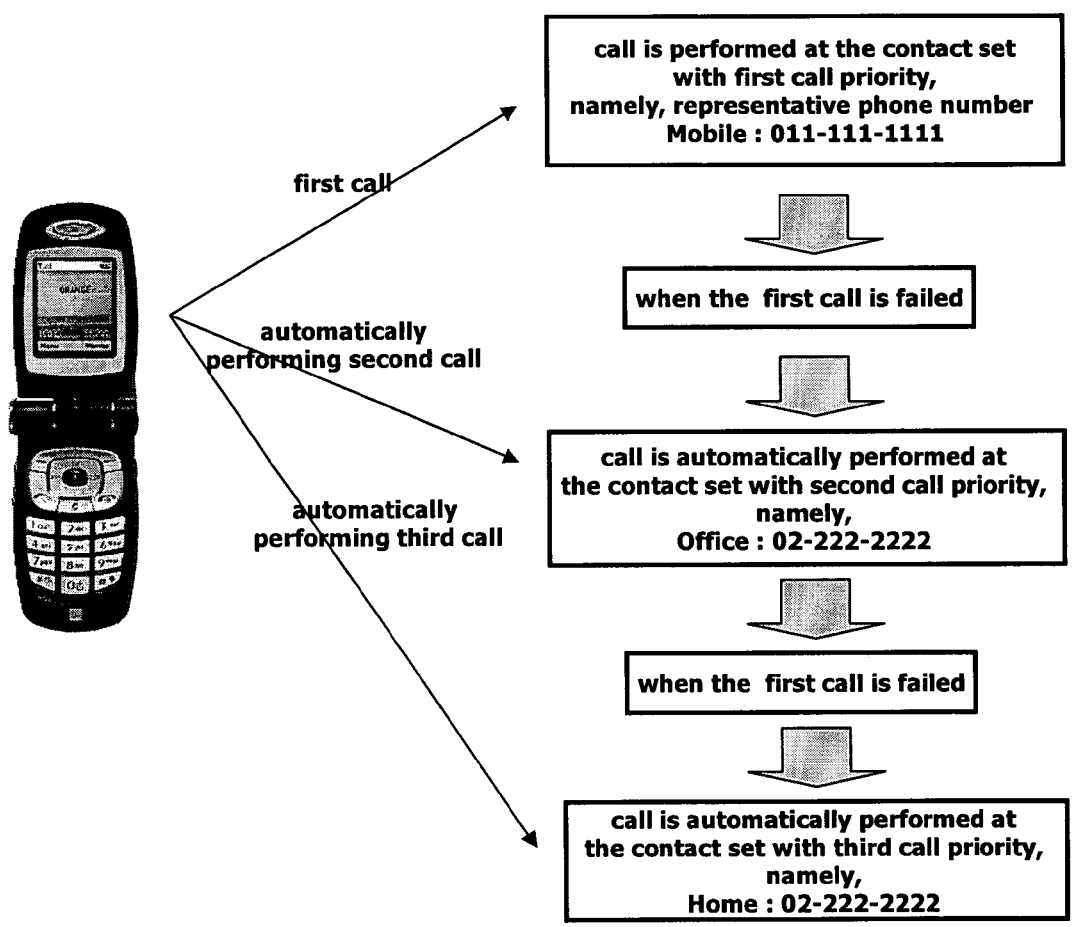
FIG. 4C is a flow chart of a procedure in which first to third calls are automatically performed in accordance with the present invention.

When the second call is automatically performed, the process returns to the step S321, and the step S321 and the following steps are repeatedly performed. Namely, as shown in FIG. 4C, if the second call (i.e., Office 02-222-2222) made at the second call priority-set contact ends in a call unavailable state as its connection is failed, call state information with respect to the second call is received and analyzed, and corresponding state information is displayed on the display 140, and thereafter, a third call (Home 03-333-3333 in FIG. 2A) is repeatedly made at the contact with third call priority.

Meanwhile, if call priority has not been set for the contacts as shown in FIG. 2B (step S341), the user can personally select another contact of the another party and make a call at the selected contact. In detail, the controller 120 can display each contact of the another party (James Kang) as shown in FIG. 4D (step S345).

Figure 4D:
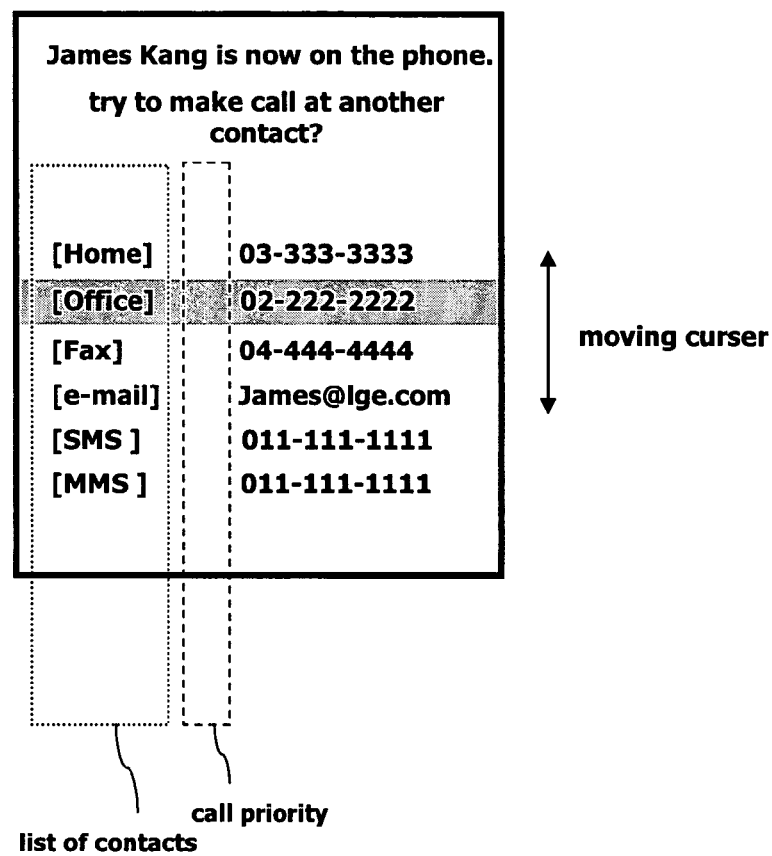
FIG. 4D shows an example of a notification window allowing a user to select contact at which the second call is to be performed in accordance with the present invention.

When the user selects particular contact (e.g., Office 02-222-2222) of the another party to which a call is desired to be made in FIG. 4D by using a certain key (e.g., a direction key) of a key pad in the mobile terminal 100 (then, a curser is highlighted to be displayed in FIG. 4D) (step S345), the controller 120 reads the selected contact (i.e., 02-222-2222) from the phone book stored in the memory unit 110 (step S346).

Next, the controller checks whether the read contact (02-222-2222) is a phone number or a different kind of contact, namely message contact (i.e., one of e-mail, SMS and MMS) (step S343).

If a kind of the read contact for performing a call to the another party, is a (different) phone number, the controller 120 performs a call at the read contact (i.e., Office 02-222-2222) (step S344). The follow-up call performing procedure is returned to the step S321, and then, the step S321 and the following steps are performed successively.

In the above descriptions, of the contact of the phone book of the another party (James Kang), the phone numbers are set with the second and third call priority, at which the call is automatically performed. Differently, a case where the SMS and the SMS are set with second and third call priority will be described as follows.

Figure 5:
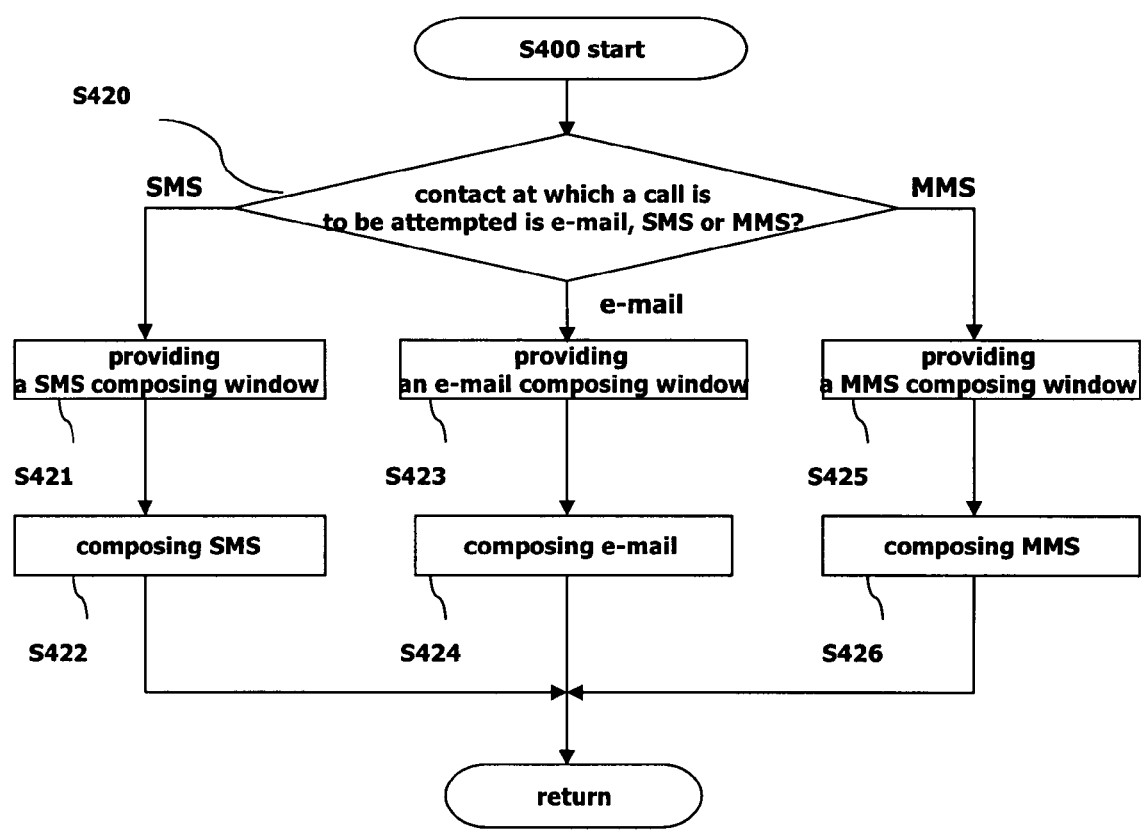
FIG. 5 is a flow chart of a sub-routine of FIG. 3 for performing a successive call at an e-mail, an SMS or an MMS after a certain call connection to another party is failed in accordance with the present invention.
Figure 6:
FIG. 6 shows an example of an SMS message composing window for performing the second call in accordance with the present invention.

FIG. 5 is a flow chart of a sub-routine of FIG. 3 for performing a successive call at a message contact such as one of an e-mail, an SMS and an MMS after a certain call connection to another party is failed in accordance with the present invention.

With reference to FIG. 5, when the first call made by the user to the another party ends in a call unavailable state, if the contact (i.e., SMS 011-111-1111 as shown in FIG. 2C) set with the second call priority of the another party (James Kang) read from the step S342 is not set as a phone number but a message contact (step S343), it is checked what kind of contact the contact with the second call priority is among e-mail, the SMS and the MMS (step S420). If the contact with the second call priority is set as the SMS, the SMS composing window is provided on the display 140. Then, the user can compose a short message on the SMS composing window (step S422) and perform a second call at the phone number (namely 011-111-1111) set for transmitting the SMS (step S344).

Meanwhile, if the contact with the second call priority is set as the e-mail or the MMS, the e-mail composing window or the MMS composing window are provided on the display (step S423 or S425) and the second call is performed (step S344) after composing a text message, video, a music file or an image file on each composing window (step S424 or S426).

The case where the call priority is not set by the user in the step S300 will be described.

When the user makes a first call to the representative contact (i.e., Mobile 011-111-1111) but the first call ends in a call unavailable state, the phone book of of the another party (James Kang) is displayed on the display 140 (step S345). Next, when the user wants to make a successive second call to the another party through different kinds of contacts, namely message contacts such as one of the e-mail, the SMS and the MMS, the user can select a desired message contact and performs the step S400 as described above.

The method for automatically performing a call when the user attempts a call by the mobile terminal but ends in a call unavailable state can be implemented by a software program, and the software program can be implemented in combination with hardware. For example, the software program for implementing the present invention can be stored in a storage medium, namely, the memory unit (e.g., an internal memory, a flash memory or a memory card, etc. of the mobile terminal), of the mobile terminal.

As so far described, the method for performing a call of a mobile communication terminal can have the following advantages.

That is, when the user makes a call to the another party at a representative phone number but the call ends in the call unavailable state, the cause of the call unavailableness can be received as a text message through the display of the mobile terminal.

In addition, although the call attempted by the user to the another party ends in the call unavailable state, the user can automatically make a call at a different phone number of the another party.

Moreover, although the call attempted by the user to the another party ends in the call unavailable state, since a window allowing the user to compose a message, through one of message contacts ,such as an e-mail, the SMS and the MMS, the user can easily communicate with the another party.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structure described herein as performing the recited function and not only structural equivalents but also equivalent structures.

What is claimed is:

1. A method for performing a call by a mobile communication terminal, comprising:
    placing a call to a specific one of a plurality of stored contact addresses of another party, the specific one having a first priority; and
    automatically placing a follow-up call to a second of the plurality of stored contact addresses if the call to the specific one of a plurality of stored contact addresses does not result in a connection, the step of automatically placing a follow-up call including
    determining whether a second call priority of the another party has been set in the plurality of stored contact addresses;
    if the second call priority of the another party has been set in the plurality of stored contact addresses, determining that one of the plurality of stored contact addresses having the second priority is the second of the plurality of stored contact addresses for the follow-up call;
    if the second call priority of the another party has not been set in the plurality of stored contact addresses, displaying the plurality of stored contact addresses, except for the specific contact address, for user selection, and receiving a user selection of a contact address as the second of the plurality of stored contact addresses for the follow-up call;
    determining if the second of the plurality of stored contact addresses is a phone number type address or a text message type address;
    attempting a call connection if the second of the plurality of stored contact addresses is determined to be the phone number type address; and
    providing one of a SMS message composing window and a MMS message composing window if the second of the plurality of stored contact addresses is determined to be the text message type address, and transmitting a text message composed on the one of a SMS message composing window and a MMS message composing window.

2. The method according to claim 1, the step of automatically placing comprising:
    automatically searching the stored plurality of stored contact addresses from an address book.

3. The method according to claim 1, further comprising:
    receiving call state information from a mobile communication network system if the call to the one of a plurality of stored contact addresses does not result in a connection.

4. The method according to claim 3, wherein the call state information includes a reason for a call connection failure.

5. The method according to claim 4, wherein the call state information is represented by a predetermined digital code.

6. The method according to claim 4, wherein the reason for a call connection failure is one of a busy state, a power-OFF, or a no-response state of the one of a plurality of stored contact addresses.

7. A mobile communication terminal configured to place a call to a specific one of a plurality of stored contact addresses of another party, the specific one having a first priority,
- automatically place a follow-up call to a second of the plurality of stored contact addresses if the call to the specific one of a plurality of stored contact addresses does not result in a connection, the terminal further configured to automatically determine if the second of the plurality of stored contact addresses is a text message type address,
- determine whether a second call priority of the another party has been set in the plurality of stored contact addresses,
- if the second call priority of the another party has been set in the plurality of stored contact addresses, determine that one of the plurality of stored contact addresses having the second priority is the second of the plurality of stored contact addresses for the follow-up call,
- if the second call priority of the another party has not been set in the plurality of stored contact addresses, display the plurality of stored contact addresses, except for the specific contact address, for user selection, and receive a user selection of a contact address as the second of the plurality of stored contact addresses for the follow-up call,
- determine if the second of the plurality of stored contact addresses is a phone number type address or a text message type address,
- attempt a call connection if the second of the plurality of stored contact addresses is determined to be the phone number type address, and
- provide one of a SMS message composing window and a MMS message composing window if the second of the plurality of stored contact addresses is determined to be the text message type address, and transmit a text message composed on the one of a SMS message composing window and a MMS message composing window.

* * * * *